United States Patent [19]

Duning

[11] 3,739,712
[45] June 19, 1973

[54] APPARATUS AND METHOD FOR COOKING HAMBURGERS OR THE LIKE

[75] Inventor: Roland L. Duning, Indianapolis, Ind.
[73] Assignee: Burger Chef Systems, Inc. (BC), Indianpolis, Ind.
[22] Filed: Jan. 27, 1971
[21] Appl. No.: 110,194

[52] U.S. Cl. ............... 99/349, 99/386, 99/390, 99/391, 99/400, 99/427, 99/443 C
[51] Int. Cl. ........................................ A47j 37/04
[58] Field of Search .............. 126/41 C; 99/349, 99/386, 387, 390, 391, 400, 446, 427, 443 C, 389

[56] References Cited
UNITED STATES PATENTS

| | | | |
|---|---|---|---|
| 1,678,337 | 7/1928 | Halifax | 99/387 |
| 3,291,036 | 12/1966 | Perl | 99/386 X |
| 3,611,913 | 10/1971 | McGinley | 99/349 |
| 2,070,850 | 2/1937 | Trabold | 99/349 |
| 1,691,361 | 11/1928 | Roberts | 99/386 |
| 2,243,993 | 6/1941 | Watson | 99/386 X |
| 3,401,626 | 9/1968 | Amalfitano | 99/349 |
| 3,517,605 | 6/1970 | Hursch et al. | 99/349 X |
| 3,229,616 | 1/1966 | Reese | 99/386 |

Primary Examiner—Billy J. Wilhite
Attorney—C. Garman Hubbard, Bruno P. Struzzi and Thomas V. Sullivan

[57] ABSTRACT

A cooker for food patties such as hamburgers or the like is comprised of two heated platens mounted in opposed relation to one another to provide opposed parallel cooking surfaces which are spaced apart no greater than the thickness of the patty to be cooked. An endless chain conveyor runs continuously through the gap between said opposed surfaces and carries the patties into cooking contact with said platens. Said conveyor is formed of a series of interconnected and spaced apart transverse elements which are maintained in a plane lying between and parallel to said opposed surfaces. The arrangement results in each patty, upon entering the gap between said opposed platen surfaces, being squeezed by one of said platens between successive transverse elements of said conveyor and into contact with the other platen as the conveyor elements in turn become partially imbedded in the surface of the patty. The chain is thus provided with sufficient traction to draw said patties through said gap, with both sides of the patties in surface contact with the opposed heating surfaces of said platens, thereby cooking said patties by heat applied conductively to both sides thereof simultaneously.

6 Claims, 6 Drawing Figures

Patented June 19, 1973

INVENTOR.
ROLAND L. DUNING

BY

ATTORNEYS

Patented June 19, 1973

APPARATUS AND METHOD FOR COOKING HAMBURGERS OR THE LIKE

BACKGROUND OF THE INVENTION

In conventional apparatus designed for automatically cooking patties of a food substance, such as hamburgers or the like, and employing a conveying mechanism for carrying the patties through a cooking stage or stages, the heating means characteristically provided is a source in one form or another of radiant heat. In apparatus of this character, the radiant heat source is disposed at a suitably spaced relation to the patty being cooked in order to prevent physical contact between the heat source and the patty or the conveyor for moving the patty into or out of cooking position in the apparatus. In apparatus employing radiant heat, the disposal of excess fat liquefied during the cooking presents problems and these are particularly acute in applications where the patty is supported above the heat source, since the fat in dripping onto the heat source not only causes excess smoke but also necessitates frequent cleaning of the apparatus. It will also be appreciated that cooking of patties of the type described with radiant heat is not as efficient as would be cooking the same article by heat applied conductively. In apparatus of this character employed in commercial establishments and designed for volume production, the efficiency with which the cooking is carried out becomes a highly important factor.

SUMMARY OF THE INVENTION

The invention overcomes problems of the sort above-mentioned, which are inherent in conventional apparatus for automatically cooking articles of the type described, by providing an apparatus wherein heat is transmitted to the articles being cooked by conduction. In accordance with the invention, two heated platens are provided and mounted with opposed cooking surfaces spaced apart a distance no greater than the thickness of the articles or patties to be cooked. A continuously driven chain conveyor running between said opposed platens carries the patties into surface contact with both of said heated surfaces. Said chain conveyor comprises a plurality of transversely extending elements pivotally joined to one another and spaced apart a distance somewhat less than the surface dimensions of a patty. The restricted space between said conveyor and the platen surface disposed on that side of the conveyor on which the patties are placed allows insufficient clearance for a patty. As a result the surface of the patty resting on said conveyor is forced or squeezed into the spaces between successive transverse conveyor elements and thus is forced into contact with the heated surface of the opposed platen. The squeezing of the supporting surface of the patty between the transverse elements of the conveyor results in said elements becoming imbedded in the said surface of the patty, thus providing increased traction between the conveyor and the patty to enable the patty to be drawn without shearing or separating through the gap between said platens while in surface contact with the heated surface of both platens. Cooking of the patties continues throughout the journey thereof through the gap between said platens, and the degree of cooking depends upon the velocity of said conveyor, the length of said platen surfaces traversed by the patties and the temperature at which they are maintained.

Preferably, the platens are mounted so that their opposed heated surfaces lie in a plane sufficiently inclined as to enable fat emanating from the patties during the cooking operation to run off at one end thereof where it can be collected in a suitable receptacle. In this manner, sufficient liquefied fat is maintained on the platen surfaces to provide proper lubrication for the passage of succeeding patties, and any excess fat which would only cause unnecessary smoke and an overly greasy product is thereby removed.

It is therefore an object of this invention to improve upon apparatus for automatically cooking food patties such as hamburgers or the like.

It is a further object of the invention to provide an automatic cooker for patties of food wherein the cooking is achieved by heat applied conductively to the patty.

It is a still further object of the invention to provide an automatic cooker for patty-like articles which is simplified in design, durable in use and efficient in operation.

Further objects of the invention, together with the features contributing thereto and the advantages accruing therefrom, will be apparent from the following description when read in conjunction with the drawing.

FIGURE DESCRIPTION

DETAILED DESCRIPTION

Figure 1:
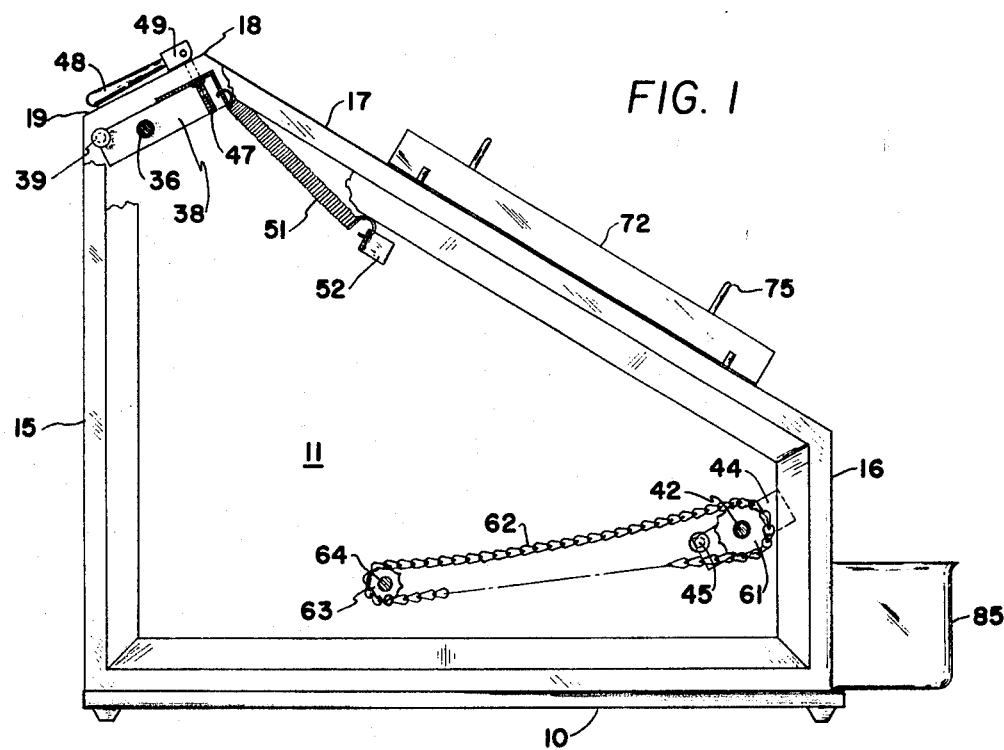
FIG. 1 is an elevational view of the right-hand side of the apparatus with the side cover removed.
Figure 2:
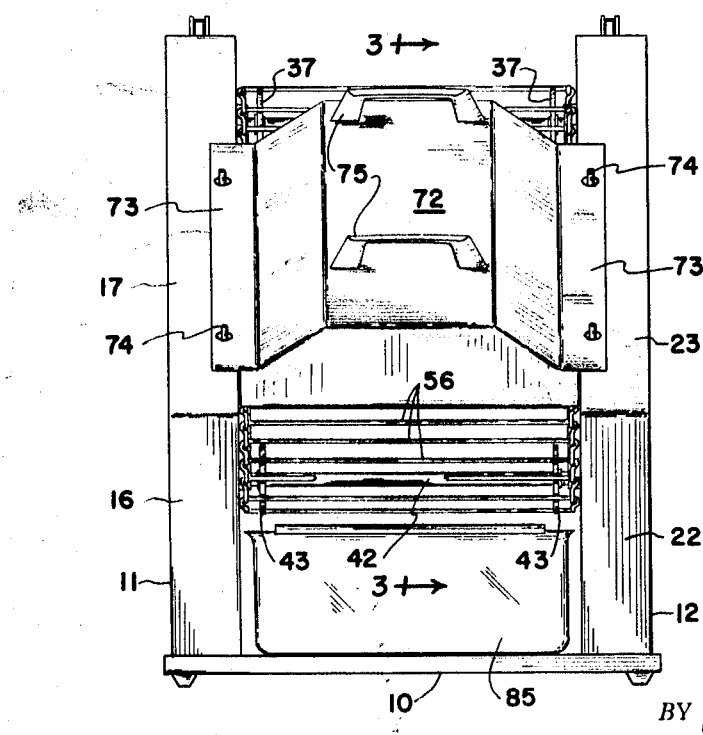
FIG. 2 is a rear elevational view of the apparatus.
Figure 3:
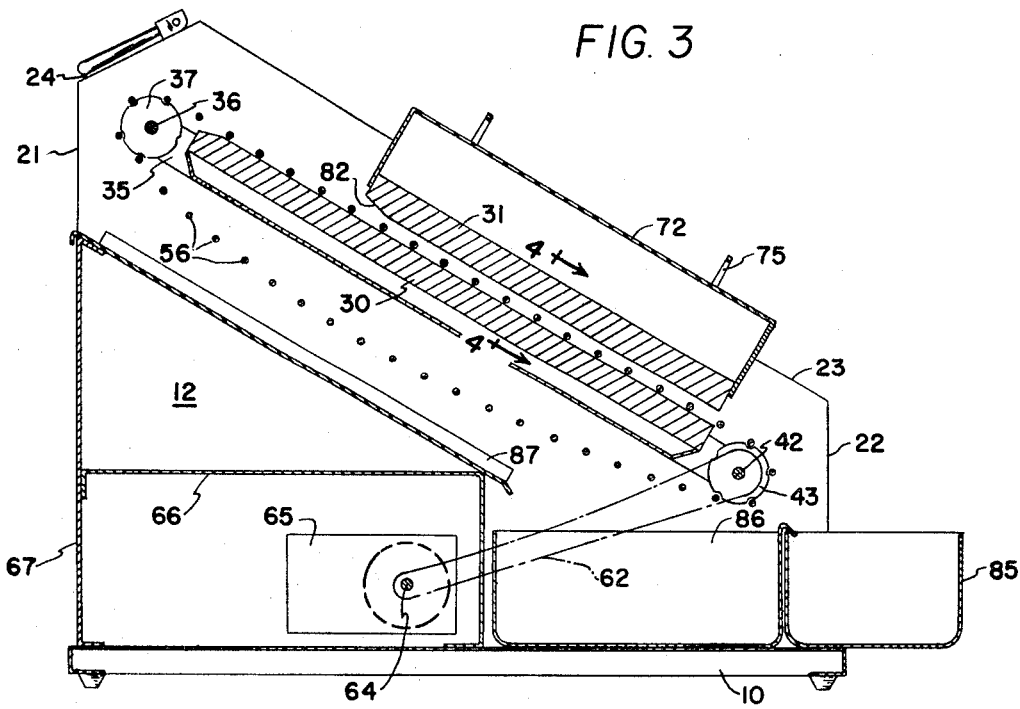
FIG. 3 is a sectional view of the apparatus taken along the line 3—3 of FIG. 2.

Referring now to the drawing, the apparatus can be seen to be supported in a framework comprised of a base panel 10 on which are mounted a right-hand side panel 11 and a left-hand side panel 12. Said panels are preferably formed of sheet metal suitably reinforced to provide the desired strength and rigidity. The side panels 11, 12 are symmetrical to one another, the sheet metal in each instance being bent to provide each panel with edges of considerable depth. In the case of panel 11, it will be seen that its edges are shaped to provide a vertical front wall 15, a vertical but somewhat shorter rear wall 16, a forwardly inclining top wall portion 17, extending from the rear wall 16 and running to an apex 18 from whence the top wall continues over a short forwardly declining portion 19 to merge with the front wall 15. The left-hand side frame panel 12 is similarly configured and its edges include a vertical front wall 21, a vertical rear wall 22, a forwardly inclining top wall portion 23, and a forwardly declining portion 24 of the top wall.

Disposed between the side frame panels 11, 12 and supported thereby at substantially the same angle of inclination as top wall portions 17, 23 are heating means comprising spaced apart heated platens 30, 31. It should be understood that the platens 30, 31 are heated by means, not shown, which may be of any suitable type such as heating coils connected to an electrical power source and that, preferably, heat control means, also not shown, are provided for maintaining the opposed cooking surfaces of the platens at a predetermined temperature or temperatures.

The platen 30, hereinafter referred to as the lower platen, is secured at each side thereof to a support bar 35. Rotatably mounted in the forward ends of the support bars 35 is a shaft 36 to which are secured a pair of chain conveyor idler sprockets 37. The shaft 36 extends beyond each of the support bars 35 and through openings in the side frame panels 11, 12, respectively. The ends of shaft 36 are journaled in pivot arms 38 pivotally attached to a pivot pin 39 secured to the respective side frame panel. The right-hand pivot arm 38 can be seen in FIG. 1, a similar pivot arm, not shown, being provided for the left-hand end of shaft 36.

Rotatably mounted in the rearward ends of the platen support bars 35 is a shaft 42 to which are secured a pair of chain conveyor drive sprockets 43. The shaft 42 also extends through openings in the respective side frame panels and is journaled in pivot arms 44, each pivotally attached to a pivot pin 45 secured to the respective side frame panel. The construction just described of the support bars 35, shafts 36, 42 and pivot arms 38, 44 constitute in effect a parallelogram linkage enabling the lower heated platen 30 to be adjustably positioned vertically without altering its angle of inclination. The adjustment of the lower platen may be effected by manipulation of an adjusting bolt 47 threaded into an ear of each of the pivot arms 38. Said bolts extend through openings in the top wall portions 19 and 24 of the respective side frame panels and are pivotally connected to adjusting levers 48 formed with a camming head 49. The camming head is formed with flat limit surfaces adapted to bear on the respective top wall portion of the side frame panel under the influence of a spring 51 stretched between a pivot arm 38 and an anchor bracket 52 secured to the respective side frame panel. As will be apparent, a fine adjustment in the elevation of the lower heated platen 30 can be made by rotation of the adjusting bolt 47. In addition, a quick and coarser adjustment of the heated platen 30 between an upper and lower setting can be effected by raising or lowering the adjusting levers 48 whereby a limit surface of the camming head 49 is effective for determining the adjusted position of the lower heating platen.

Figure 4:
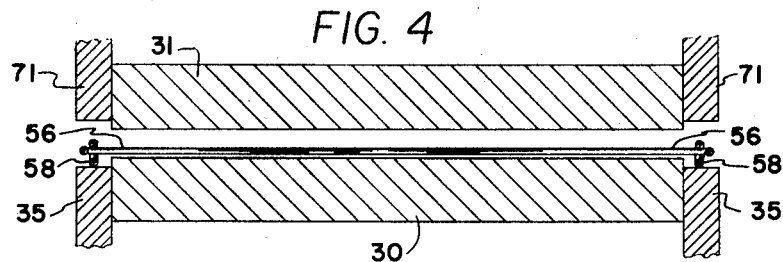
FIG. 4 is a fragmentary view in section taken along the line 4—4 of FIG. 3.

The sprockets 37, 43 operate to support and drive continuously an endless chain conveyor 55 which extends around the lower heated platen 30 and in so doing runs downwardly across the upper cooking surface of the lower heated platen 30. Said chain conveyor is comprised of a series of rods 56, the main central portions of which are uniformly spaced from one another and are disposed transversely to the direction of conveyor chain travel. The end portions 57 of each rod are bent at substantially a right angle to the main central portion, and the tip 58 of each rod is curled around the main central portion of the next adjacent rod so as to pivotally join one rod to the next. As can be seen best in FIG. 4, the curled under tips 58 of the rods are disposed to bear on the platen support bars 35, the surface of which is stepped slightly below the upper surface of platen 30. This results in the main transversely disposed central portion of each rod 56 being supported in slightly spaced relation to the upper heating surface of the lower heated platen 30.

The chain conveyor 55 is continuously driven by means which include a chain sprocket 61 secured to the right-hand end of shaft 42. An endless drive chain 62 wrapped about sprocket 61 runs to a sprocket 63 fastened to the drive shaft 64 of a conveyor drive motor 65. The motor may be mounted in any suitable manner on the frame of the machine and, preferably, is located within an enclosure defined by bent partition panel 66, a front cover panel 67 and the base panel 10, said enclosure also containing wiring and appropriate circuit control elements, not shown.

The platen 31, hereinafter referred to as the upper heated platen, is supported at each side thereof by bars 71. Said platen and bars are suitably secured within an assembly which includes a cover panel 72. Said cover panel is formed at each side thereof with outwardly bent flanges 73 adapted to rest on the inclined surfaces 17, 23 of the right and left side panels 11, 12, respectively. Preferably the flanges 73 are formed with openings for accommodating aligning pins 74 projecting from surfaces 17, 23. The assembly for the upper heated platen is thus detachably mounted on the machine so as to enable its removal manually for any desired reason such as to clean the equipment. Handles 75 are provided to facilitate manual removal of the assembly.

The upper heated platen 31 is thus supported so that its lower cooking surface will lie in a plane substantially parallel to the upper cooking surface of the lower platen 30. The gap between the cooking surfaces of the respective platens is adjusted by the adjustable mounting means for the lower platen previously described so as to be substantially equal to the thickness of the articles to be cooked, said articles in the present instance being meat patties 80 which are deformable and, preferably, substantially flat and uniform in thickness.

Figure 5:
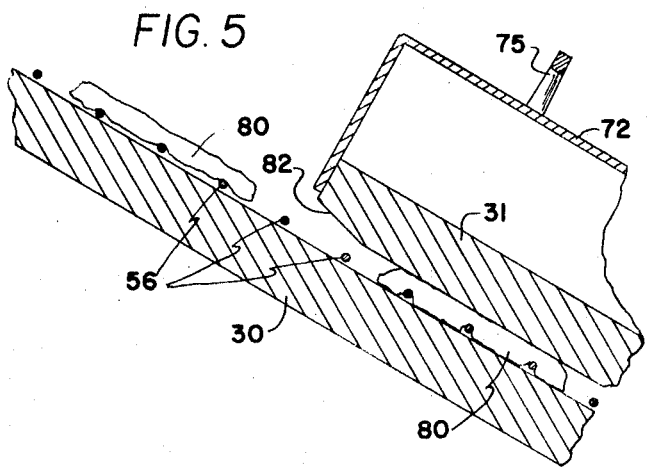
FIG. 5 is a fragmentary view in section along the same section as FIG. 3 and illustrating patties being conveyed through the apparatus.
Figure 6:
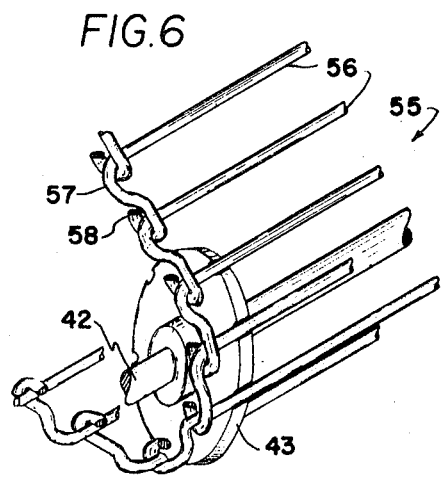
FIG. 6 is a detailed view in perspective illustrating the construction of the chain conveyor mechanism of the apparatus.

FIG. 5 illustrates two patties being processed, the leading one of said patties having been carried by the conveyor chain into the gap between the upper and lower platens 30, 31. The trailing patty 80 is shown as it is approaching the gap between said upper and lower platens. As illustrated in FIG. 5, the trailing patty 80, after having been placed on the conveyor chain 55, is initially supported by the conveyor chain rods 56 at a slightly spaced relation to the surface of the lower heated platen 30. As a patty 80 is drawn into the gap between the upper and lower heated platens, it encounters a beveled portion 82 in the cooking surface of the upper platen 31. Since the gap between the parallel cooking surfaces of the platens 30, 31 is substantially equal to the thickness of the patty 80, the beveled portion 82 acts to press against the surface of the patty and squeeze the body thereof into the spaces between the successive rods 56 of the chain conveyor. Thus, as a patty is drawn completely into the gap between the platens 30, 31, it is squeezed downwardly through the spaces between the conveyor chain rods 56 so as to be disposed with its upper surface in contact with the upper platen 31 and substantially all its lower surface in contact with the lower heated platen 30. The squeezing of the patty 80 between the conveyor chain rods 56 has the effect of imbedding the rods within the lower surface of the patty. Thus the conveyor achieves a grip on the patty which provides adequate traction between the conveyor and the patty to draw the patty completely through said gap without it tearing apart or shearing despite the friction created by the surface engagement of the patty with both platens 30, 31.

In this manner, as a patty continues to progress to the gap between said platens 30, 31, it is continuously heated by conduction on both its upper and lower surfaces simultaneously. The degree to which the patties are cooked can be determined by the speed at which the chain conveyor operates and the degree of heat at which the platens 30, 31 are maintained. As the patties emerge from the gap between the platens 30, 31, they are carried to the point where the conveyor chain runs around sprockets 43, at which point the patties drop off the conveyor and into a receiving pan 85 preferably provided therefor. The receiving pan 85 rests on the base panel 10 along with a drip pan 86 disposed to receive grease which runs off the surface of the heated platens. The equipment, preferably, includes also a drip chute 87 supported by the front cover panel 67 and the enclosure partition 66 in a position to collect and channel into the drip pan 86 any grease which may drip off the conveyor chain on its return travel between sprockets 43 and 37. The mounting of the platens 30, 31 at an angle inclined to the horizontal provides assurance that the entire cooking surfaces of the platens will be continually supplied with a coating of grease in sufficient quantity to serve as a lubricant for the passage of the patties even though said surfaces are preferably furnished with a friction reducing coating such as Tufram, Teflon or the like. This lubricating coating results from the drainage of the grease downwardly and off the rearward edge of the platens and into the drip pan 86. The arrangement also assures that only a quantity of grease necessary for lubrication will be maintained on the cooking surfaces since any excess grease over and above that necessary for lubrication would be drained away and collected in the drip pan.

While there has been shown and described what is considered to be a preferred embodiment of the invention, it will be understood that changes in form could readily be made without departing from the spirit of the invention. It is, therefore, intended that the invention be not limited to the exact form herein shown and described nor to anything less than the whole of the invention as hereinafter claimed.

What is claimed is:

1. A grill for cooking flat deformable patties of a meat-like substance comprising,
    a. a first platen disposed to present a flat heated cooking surface in a plane inclined to horizontal,
    b. a second platen disposed to present a flat heated cooking surface in a plane substantially parallel to that of the cooking surface of said first platen and in opposed relation thereto to define a gap therewith of a distance substantially equal to the thickness of a patty, and
    c. a continuously driven endless chain conveyor comprising a series of pivotally interconnected spaced apart rods and extending through said gap for carrying patties through said gap and into surface contact with both of said cooking surfaces simultaneously, said rods while traversing said gap being supported at their ends to cause their main central portion to proceed in a plane lying between and parallel to said opposed cooking surfaces wherein said rods become imbedded within the surface of a patty being conveyed thereby, whereby said patties are cooked by heat transferred conductively and simultaneously to opposite surfaces thereof by said platens while being conveyed through the gap therebetween.

2. The invention according to claim 1 wherein,
    a. the rods comprising said chain conveyor at their main central portion are disposed transversely to the direction of conveyor travel, and
    b. the ends of said rods extend substantially at right angle to their main central portion to pivotally interconnect with the next adjacent rod of the series.

3. The invention according to claim 2 wherein,
    a. said rods are spaced apart a distance less than the shortest surface dimension of said patties.

4. The invention according to claim 1 wherein,
    a. at least one of said platens is formed with a beveled surface area leading to said gap and along the edge of the respective cooking surface whereat the patty is carried into said gap, said beveled surface area being effective for squeezing the patty between said spaced apart rods and into surface contact with the oppositely disposed cooking surface.

5. The invention according to claim 1 including,
    a. mounting means for one of said platens manually adjustable to vary the gap between said cooking surfaces, said mounting means including levers pivotally connecting said platen with the frame of the grill to render said platen and frame opposed elements of a parallelogram type linkage.

6. The invention according to claim 5 including,
    a. adjusting levers rotatably manipulable for effecting the adjustment of said one platen, said adjusting levers being connected to said linkage and having a camming head cooperating with the framework of the grill for determining a plurality of adjusted settings of said platen in accordance with the rotative setting of said adjusting levers.

* * * * *